United States Patent [19]
Creech

[11] Patent Number: 6,109,409
[45] Date of Patent: Aug. 29, 2000

[54] SPRAG FAMILY

[75] Inventor: Michael Z. Creech, Grosse Pointe Woods, Mich.

[73] Assignee: Dana Corporation, Toledo, Ohio

[21] Appl. No.: 08/949,741

[22] Filed: Oct. 14, 1997

[51] Int. Cl.[7] .................................................. F16D 41/07
[52] U.S. Cl. ........................................ 192/45.1; 192/41 A
[58] Field of Search ................................ 192/45.1, 41 A, 192/48.92

[56] References Cited

U.S. PATENT DOCUMENTS

| | | |
|---|---|---|
| 1,542,040 | 6/1925 | De Lavaud . |
| 1,694,377 | 12/1928 | De Lavaud . |
| 2,388,424 | 11/1945 | Lund ........................................ 192/45.1 |
| 2,486,262 | 10/1949 | Davis ...................................... 192/45.1 |
| 2,711,238 | 6/1955 | Szady ...................................... 192/45.1 |
| 3,066,778 | 12/1962 | Maurer ................................... 192/45.1 |
| 3,550,737 | 12/1970 | Kent ....................................... 192/45.1 |

*Primary Examiner*—Rodney H. Bonck
*Attorney, Agent, or Firm*—Rader, Fishman & Grauer, PLLC

[57] ABSTRACT

A family of one-way sprag clutches is disclosed. Each clutch includes concentric inner and outer races, each defining a bearing diameter and a sprag diameter. In a first embodiment, outer race bearing and sprag diameters are equal, while in a second embodiment, inner race bearing and sprag diameters are equal. The clutches of the family include at least one race differing in bearing diameter by a predetermined increment multiple. A bearing corresponding to the inner and outer race bearing diameters and a plurality of identical sprags are arranged between the races. Each sprag includes a pre-selected arc-length defined as a function of bearing diameter such that for each diameter multiple within the family a whole number of sprags are used to achieve positive continuous engagement.

12 Claims, 3 Drawing Sheets

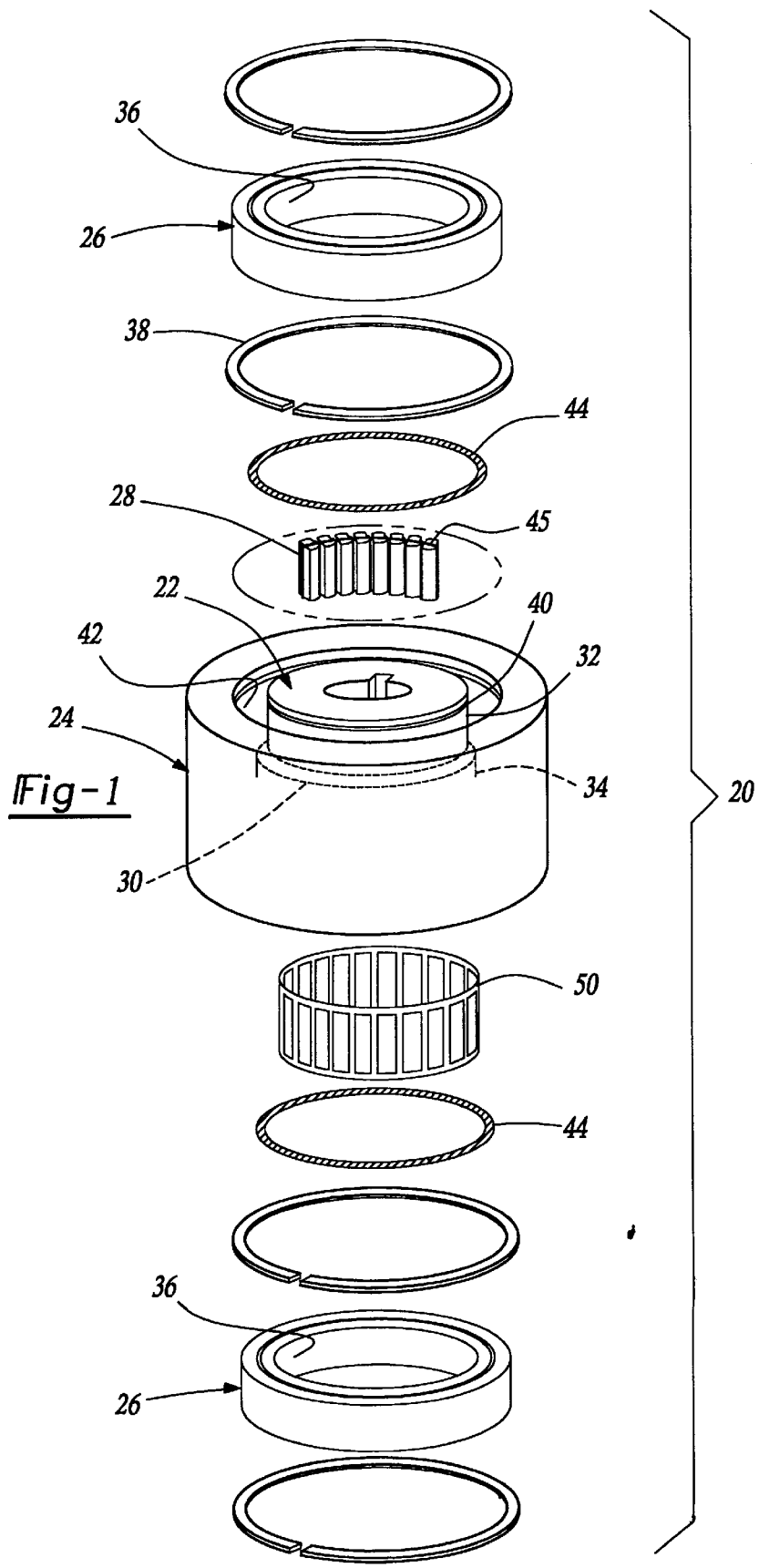

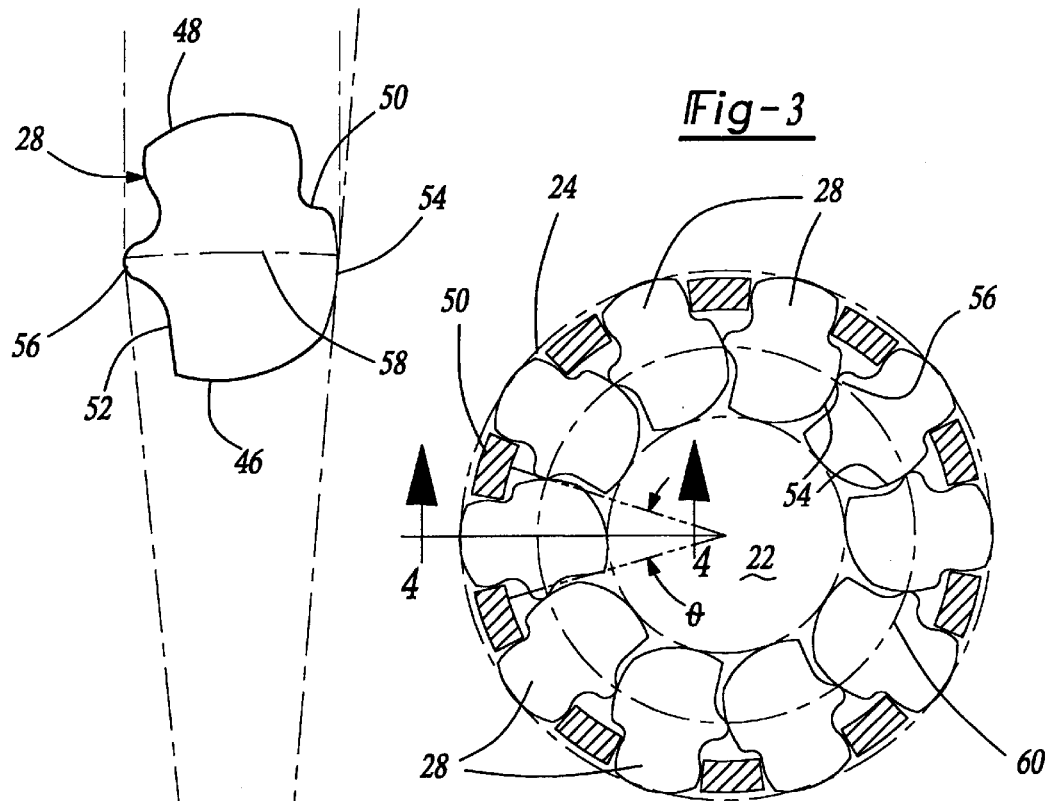
Fig-3
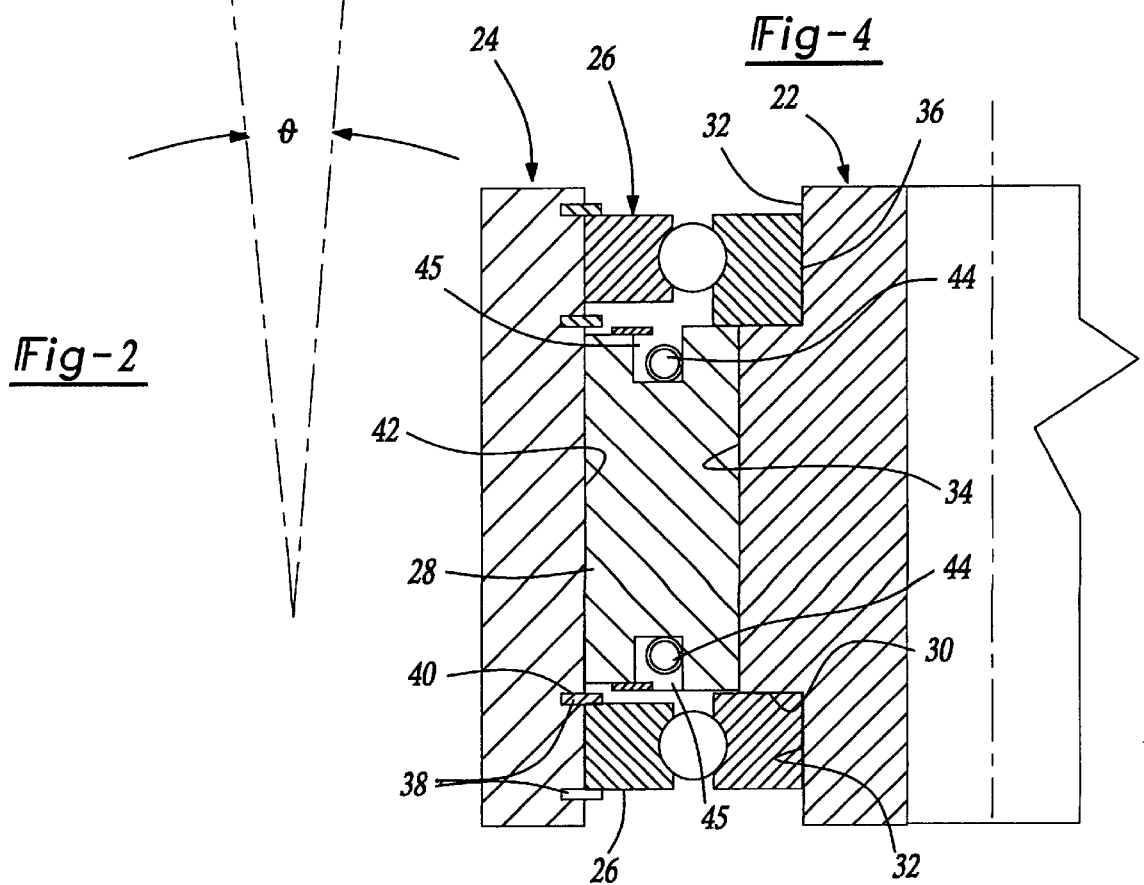
Fig-2
Fig-4

SPRAG FAMILY

FIELD OF THE INVENTION

The present invention relates to centrifugal liftoff sprag clutches. More particularly, the invention relates to a family of one-way clutches with pre-determined increments of race bearing diameter utilizing identical sprags, the sprags being in positive continuous engagement for controlling torque delivery in a torque flow path between a driving member and a driven member.

BACKGROUND OF THE INVENTION

Sprag clutches with a plurality of sprags positioned between an inner race and an outer race are well known. Typically, the sprags are retained within a cage that rotates together with one of the races. Sprag clutches which use a centrifugal liftoff action to effect liftoff of the sprags from either the inner race or the outer race are also known. The sprags are typically biased by a spring into engagement with both races to effect a wedging action, or lockup, to prevent rotation of one of the races relative to the other in a first direction. Relative rotation of the races with respect to each other in a second direction, called overrunning, is permitted. At a certain angular velocity of a race in the second direction, the centrifugal force acting on the sprags due to an asymmetric geometry of each sprag reaches a level that causes the sprags to pivot about an axis of rotation such that a clearance develops between the sprags and the races. The clearance, or rollover, removes the torque coupling between the races.

Smooth rotation and concentricity of the races are controlled by a plurality of bearings placed adjacent to the sprags between the races. Bearing inner diameter corresponds with and defines a portion of an outer diameter of the inner race. Similarly, bearing outer diameter corresponds with and defines a portion of an outer race inner diameter. Precision bearings are available in many sizes and in many increments of outer diameter. Therefore, many bearing diameters are possible in a family of clutches.

Bearing radial thickness is usually larger than a corresponding radial thickness of a sprag placed between the races. Known clutch designs account for the difference between bearing radial thickness and sprag radial thickness by machining steps in both inner race outer diameter and outer race inner diameter. When assembled, the steps cooperate to define a radial gap corresponding to sprag radial thickness that is smaller than a radial gap formed to accommodate a bearing radial thickness. Thus, in conventional clutches, both races include a bearing diameter as well as a different sprag diameter. Such a configuration is expensive and time consuming to machine and manufacture, requiring tight tolerances.

In some sprag clutches, the radial gap between the races defined by the steps may be filled with sprags in positive continuous engagement. Sprag positive continuous engagement means that each sprag is in contact with adjacent sprags before rollover of the sprag into a lockup position, and each sprag maintains that contact in the lockup position. Positive continuous engagement is enabled by designing a sprag geometry such that one radially extending side of the sprag includes a nose portion which contacts a second radially extending side of a second, adjacent sprag. Sprag circumferential width between the contact points of a single sprag defines a sprag arc-length, while the contact points of all sprags define a sprag contact diameter along which adjacent sprags are positively continuously engaged.

While conventional sprag clutches may make use of a single sprag design and size to improve design efficiency, each clutch must be designed with particular and distinct bearing diameters and sprag diameters. In particular, race diameters, sprag diameters, and bearing inner and outer diameters all impact design of a clutch and step height. Therefore, changing race diameters requires customization of bearing diameters, sprag diameters or both to utilize identical sprags in each clutch, creating design and manufacture difficulties.

SUMMARY OF THE INVENTION

The present invention relates to a family of one-way sprag clutches with predetermined bearing diameter increments. Each clutch in the family of clutches includes concentric inner and outer races rotating about each other. Each race has a pre-selected bearing diameter corresponding to known bearing diameters on which the races concentrically rotate about each other. Clutch size within the family varies by pre-determined bearing diameter increments. Each race further includes a pre-selected sprag diameter. A plurality of identical sprags are arranged between the races. Each sprag includes an inner and an outer surface for respectively engaging the inner and outer race sprag engagement surfaces. Each sprag also includes first and second radially extending surfaces extending between the inner and outer sprag surfaces. The first radially extending surface includes a nose for contacting the second radially extending surface of an adjacent sprag along a sprag contact diameter. Each sprag occupies a partial arc-length along a pre-determined sprag contact diameter along which one sprag contacts an adjacent sprag during lockup. Sprag arc-length is chosen in combination with a constant difference between sprag contact diameter and a race sprag diameter such that for each bearing diameter in the family of clutches, addition or subtraction of a whole number of sprags is required to achieve positive continuous engagement between each adjacent sprag along the sprag contact diameter, the number of sprags required depending upon bearing diameter. In a first embodiment, the outer race bearing diameter and sprag outer diameter are equal. In a second embodiment, the inner race bearing diameter and sprag inner diameter are equal.

Each clutch in the family of the present invention is easier, faster and less expensive to manufacture. Bearings are available in pre-determined inner and outer diameters and in pre-determined diametrical increments. Thus, race bearing diameters are selected through selection of the bearing. In the first embodiment, outer race sprag diameter is also selected through bearing selection. Since the outer race sprag diameter and bearing diameter are identical in the first embodiment, the outer race may simply be bored through. Only the inner race must be custom machined, decreasing manufacture time. Moreover, because bearing sizes change by known increments, bearing diameters and outer race sprag diameter likewise change by known increments. Manufacturing costs are further reduced by using the identical sprag in different sized clutches within the family. By manufacturing identical sprags with a arc-length defined as a function of bearing diameter, identical sprags may be used to achieve positive continuous engagement in clutches of different bearing diameters simply through the addition or subtraction of a whole number of sprags. In the second embodiment, only the outer race sprag diameter need be custom machined, while the inner race need only be formed with one bearing and sprag diameter.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of a sprag clutch using a first embodiment of the present invention.

FIG. 2 is a cross-sectional view of a sprag designed in accordance with the present invention.

FIG. 3 is a cross-sectional view of a sprag clutch of the present invention.

FIG. 4 is a cut away view of a sprag clutch showing the first embodiment of the present invention, taken along line 4—4 of FIG. 3.

DETAILED DESCRIPTION OF THE PREFERRED EMBODIMENT

Figure 5:
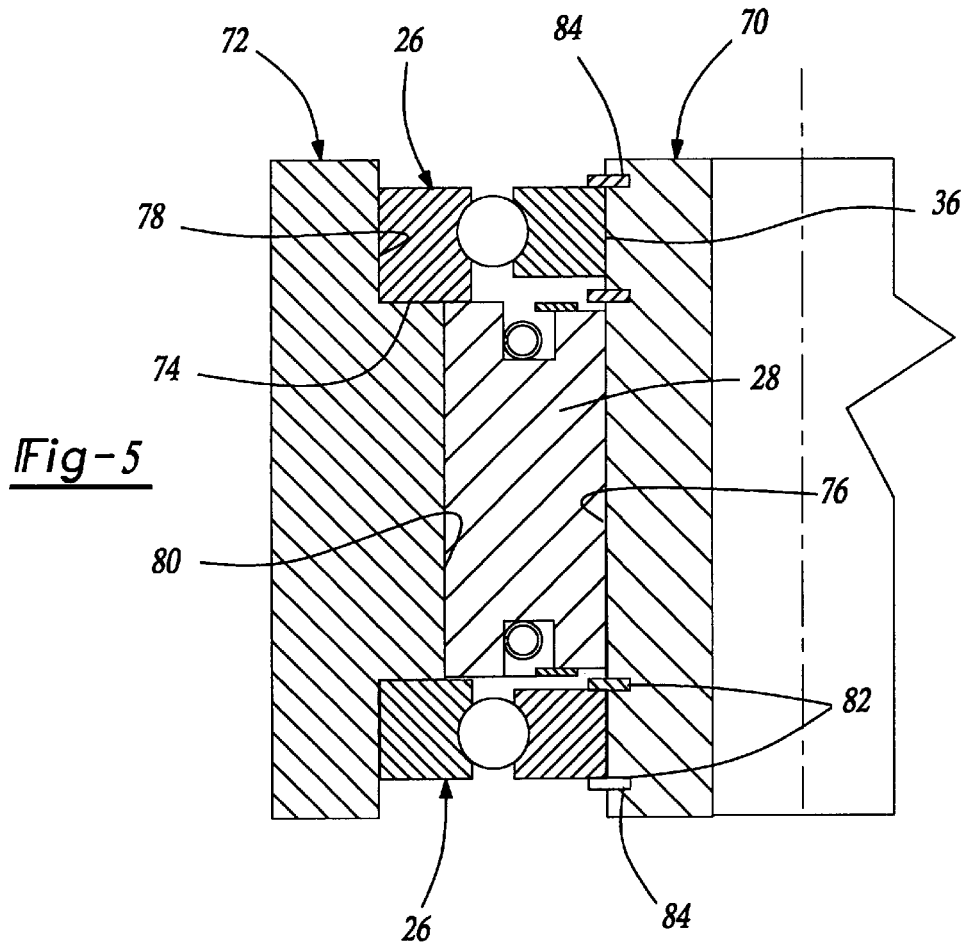
FIG. 5 is a cut away view of a sprag clutch showing a second embodiment of the present invention, taken along line 4—4 of FIG. 3.

The configuration of a family of one-way sprag clutches with pre-determined bearing diameter increments according to the present invention is demonstrated with reference to FIG. 1. Clutch 20 includes an inner race 22, an outer race 24 and bearings 26. Races 22 and 24 are substantially cylindrical and concentrically mounted. Bearings 26 allow smooth, concentric rotation of races 22, 24 about each other. Each race 22, 24 is adapted to be respectively connected with an associated rotatable member (not shown). A plurality of torque engagement members or sprags 28 is disposed between the races 22, 24. Sprags 28 are biased into engagement with races 22, 24 by garter springs 44 which are located within slot 45 formed in both ends of sprag 28. Sprag location is controlled by placing sprags 28 within cage 50.

Both inner race 22 and outer race 24 are manufactured with bearing diameters and sprag diameters. In a first embodiment of the invention, shown in FIGS. 1 and 4, inner race 22 is provided with a step 30. As a result, the outer circumference of inner race 22 includes a bearing engagement surface 32 and a sprag engagement surface 34. The diameter of bearing engagement surface 32 corresponds to and is defined by a diameter of an inner surface 36 of bearing set 26. Thus, the diameter of bearing engagement surface 32 of inner race 22 defines an inner race bearing diameter. In the same way, sprag engagement surface 34 defines an inner race sprag diameter. As can be seen in FIGS. 1 and 4, inner race sprag diameter is greater than inner race bearing diameter. Bearing retainer rings 38 are received in corresponding grooves 40 machined in the races and serve to help prevent axial movement of bearing 26 and to restrict axial movement of sprag 28.

In a first embodiment, outer race inner surface 42 does not include a step, but rather is a straight bore through outer race 24. Thus, both outer race bearing diameter and outer race sprag diameter are equal, and are defined by the outer circumference of bearing 26. The outer circumference of sprags 28 is also defined by the outer circumference of bearing 26. Because outer race 24 does not include a step, machining costs are reduced, decreasing clutch cost. Moreover, because diameters of available bearings are known, necessary diameters for clutch components are known as well, making design of the family of clutches simpler.

The ability to design a family of clutches which all include a bored through outer race and use standard available bearings which define bearing diameters and at least one sprag diameter in the clutch results from the innovative design of sprags 28. As shown in FIG. 2, sprag 28 includes arcuate inner and outer race engaging surfaces 46 and 48, and is asymmetrically shaped. Sprag 28 also includes first and second radially extending surfaces 52 and 54 which extend substantially radially between inner and outer race engaging surfaces 46 and 48. First radially extending surface 52 includes a nose 56. As shown clearly in FIG. 3, nose 56 of a first sprag 28 is in contact with second surface 54 of an adjacent sprag 28 when all sprags of the clutch are arranged between races 22 and 24. Sprags 28 are separated by retainer 50 until force on either race causes engagement. Engagement between the sprags 28, called positive continuous engagement, occurs when each sprag contacts adjacent sprags along a sprag contact diameter during lockup, and each sprag maintains that contact in rollover.

Referring back to FIG. 2, sprag 28 is demonstrated in the lockup position. A circumferential arc-length 58 of sprag 28 is located between nose 56 and second radially extending surface 54. Arc-length 58 of sprag 28 is defined by a circumferential partial arc-length of a pre-determined sprag contact diameter, shown as circle 60 in FIG. 3. All contact between adjacent sprags in FIG. 3 occurs along circle 60, the sprag contact diameter. Circumferential arc-length 58 is constant over the family of clutches, because identical sprags are used for each clutch. Moreover, because identical sprags are used, the difference between outer race sprag diameter and sprag contact diameter remains constant within the family of clutches. But swept angle Θ formed by arc-length 58 when viewed from axis of rotation 64 varies between clutches of different sizes, as discussed below. Arc-length 58 is defined by the following relation:

$$SpragArcLength = (D_r - 2I)\pi/Nn$$

where:

$D_r$ = Bearing Outer Diameter $I$ = Fixed bearing increments $N$ = Number of Sprags $n$ = an integer For example, when Dr is a 110 mm metric bearing, I is 5 mm, N=40 sprags and n=1, then the sprag arc-length is 7.85 mm. A whole number of sprags 28 designed to maintain a arc-length 58 of 7.85 mm could be used in a family of clutches having an outer bearing diameter $D_r$ that is a multiple of 5mm (because I=5) to achieve positive continuous engagement in a clutch with an outer race having no step machined thereon. Since bearing outer diameter $D_r$ is nominally identical to outer race inner diameter, outer race inner diameter would increment with $D_r$. Thus, arc-length 58 may be pre-selected such that for each bearing diameter in the family of clutches, addition or subtraction of a whole number of sprags 28 is required to achieve positive continuous engagement between each adjacent sprag along the sprag contact diameter (circle 60), the number of sprags required depending upon a bearing diameter equal to outer race inner diameter.

In a second embodiment, shown in FIG. 5, inner race 70 does not include a step, while outer race 72 includes step 74. Thus, outer surface 76 of inner race 70 acts as both a bearing engagement surface and a sprag engagement surface, and has a diameter corresponding to the diameter of bearing inner surface 36. Step 74 in outer race 72 provides outer race 72 with a bearing engagement surface 78 and a sprag engagement surface 80. Sprag engagement surface 80 has a smaller diameter than bearing engagement surface 78. Bearing retainer rings 82 are received in corresponding grooves 84 machined in bearing engagement surface 78 on outer race 72 and serve to help prevent axial movement of bearing 26 and to restrict axial movement of sprag 28.

In the second embodiment, where outer race 72 includes step 74, sprag arc-length 58 is defined by the following relation:

$$SpragArcLength_2 = (D_{ir} + 2I)\pi N n$$

where:

$D_{ir}$=Bearing Inner Diameter

I=Fixed bearing increments

N=Number of Sprags n=an integer

For example, when $D_{ir}$ is a 110 mm metric bearing, I is 5 mm, N=40 sprags and n=1, then the sprag lock-up length is 9.42 mm. A whole number of sprags 28 designed to maintain a arc-length 58 of 9.42 mm could be used in any clutch having an inner bearing diameter Dir that is a multiple of 5 mm (because I=5) to achieve positive continuous engagement with an inner race having no step machined thereon. Since bearing inner diameter $D_{ir}$ is nominally identical to inner race outer diameter, inner race diameter would increment with $D_{ir}$. Thus, arc-length 58 may be pre-selected such that for each bearing diameter in the family of clutches, addition or subtraction of a whole number of sprags 86 is required to achieve positive continuous engagement between each adjacent sprag along sprag circle 60 (shown in FIG. 3), the number of sprags required depending upon a bearing diameter nominally equal to inner race outer diameter.

Figure 6:
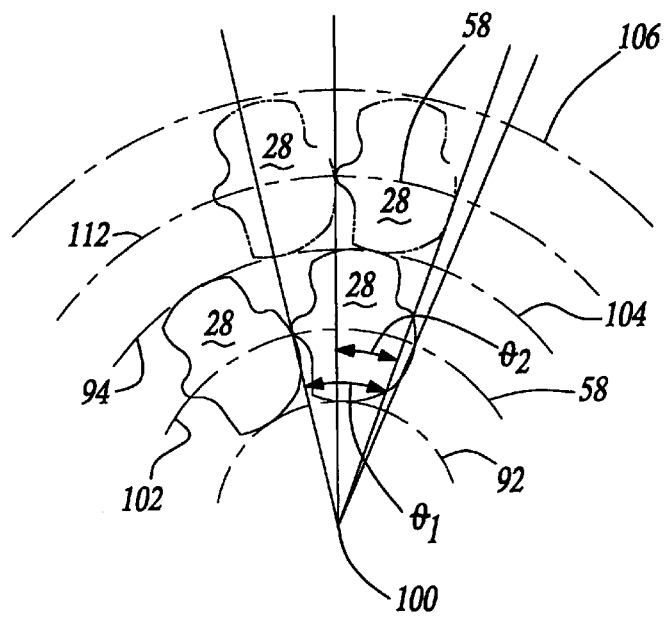
FIG. 6 is an illustrative view showing a family of clutches according to the present invention utilizing identical sprags in clutches of different diameters, the sprags having identical arc-lengths.

FIG. 6 demonstrates the use of identical sprags in clutches of different diameters. Two clutches are shown transposed, using identical sprags. The first clutch shown in FIG. 6 includes an inner race sprag engagement surface 92 and outer race sprag engagement surface 94. Sprag 28 between inner race sprag engagement surface 92 and outer race sprag engagement surface 94 has a arc-length 58, the length of which corresponding to the arc length of angle $\Theta_1$ viewed from axis of rotation 100. Arc-length 58 lies along sprag contact diameter 102. By increasing the size of the first clutch by a pre-determined amount and using a whole number of identical sprags according to a relationship defined above, the second clutch of FIG. 6 may be designed. The second clutch shown in FIG. 6 includes an inner race sprag engagement surface 104 and an outer race sprag engagement surface 106, between which sprag 28 is placed. In the second clutch, sprag 28 has a arc-length 58, the length of which corresponds to the arc length of angle $\Theta_2$ viewed from axis of rotation 100. Arc-length 58 lies along sprag contact diameter 112, which is greater than sprag contact diameter 102. But both arc-lengths 58 are equal, because identical sprags 28 are used in both clutches. Angle $\Theta_1$ is greater than angle $\Theta_2$ because of the difference in sprag contact diameters 102, 112 between the first and second clutches. But due to the relationships described above, a whole number of sprags 28 are placed about sprag diameter 112, just as a whole number of sprags 28 are placed about sprag diameter 102, though the number of sprags 28 placed about sprag diameter 112 is greater than the number of sprags 28 placed along sprag diameter 102. Because of the above relationships, an entire family of clutches may be constructed that includes a whole number of identical sprags with positive continuous engagement between the sprags in combination with a constant outer race inner diameter, as in the first embodiment, or constant inner race outer diameter, as in the second embodiment.

Designing and manufacturing a family of clutches according to the present invention is improved over the prior art with the present invention. To design a family of clutches according to the present invention, race bearing diameter is determined, as is the desired bearing size increment. Race diameters vary according to bearing diameters and desired increment only, so race bearing diameters are selected through selection of the bearing. In the first embodiment, outer race sprag diameter is also selected through bearing selection, while inner race sprag diameter is selected through bearing selection in the second embodiment. Since the outer race sprag and bearing diameters are identical in the first embodiment, the outer race may simply be bored through. Similarly, the inner race of the second embodiment may be easily machined to include only one diameter. Only one race need be custom machined in the present invention, decreasing manufacture time and assembly complexity. Moreover, because bearing sizes change by known increments, bearing diameters and outer race sprag diameter likewise change by known increments. Manufacturing costs are further reduced by using the identical sprag in different sized clutches within the family. By manufacturing identical sprags with a arc-length defined as a function of bearing diameter, identical sprags achieve positive continuous engagement in clutches of different bearing diameters simply through the addition or subtraction of a whole number of sprags. As a result, a family of clutches, all with sprags in positive continuous engagement, may be designed as simply as designing one clutch with known bearing diameters and potential increments thereof.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A family of one-way sprag clutches, comprising:

concentric inner and outer races rotating about each other, each of said races defining a bearing diameter and a sprag diameter;

a bearing between the races having inner and outer diameters corresponding to said inner and outer race bearing diameters, said bearing diameters differing within the family by a pre-determined increment multiple;

a plurality of identical sprags arranged between said races, each said sprag including inner and outer surfaces for respectively engaging said inner and outer race sprag diameters and further including first and second radially extending surfaces extending between said inner and outer surfaces;

said first radially extending surface including a nose such that the circumferential width of said sprag between said nose and said second radially extending surface defines a circumferential arc-length, said nose contacting said second radially extending surface of an adjacent sprag along a pre-determined sprag contact diameter;

said arc-length being pre-selected as a function of one of said bearing diameters and of said pre-determined increment multiple such that for said multiple a whole number of sprags are used to achieve positive continuous engagement.

2. A family of one-way sprag clutches as in claim 1, wherein said outer race bearing diameter equals said outer race sprag diameter.

3. A family of one-way sprag clutches as in claim 2, wherein said arc-length is pre-selected using the relationship:

$$ArcLength = (D_r - 2I)\pi/Nn$$

where:

$D_r$ = Bearing Outer Diameter $I$ = Fixed bearing increments $N$ = Number of Sprags $n$ = an integer.

4. A family of one-way sprag clutches as in claim 1, wherein said inner race bearing diameter equals said inner race sprag diameter.

5. A family of one-way sprag clutches as in claim 4, wherein said arc-length is pre-selected using the relationship:

$$ArcLength = (D_{ir} + 2I)\pi/Nn$$

where:

$D_{ir}$ = Bearing Inner Diameter $I$ = Fixed bearing increments $N$ = Number of Sprags $n$ = an integer.

6. A one-way sprag clutch, comprising:

concentric inner and outer races rotating about each other, each of said races defining a pre-selected bearing diameter and a sprag diameter;

a bearing between said races having inner and outer diameters corresponding to said inner and outer race bearing diameters, said bearing diameters differing by a pre-determined increment multiple;

a plurality of identical sprags arranged between said races, each said sprag including inner and outer surfaces for respectively engaging said inner and outer race sprag diameters and further including first and second radially extending surfaces extending between said inner and outer surfaces;

said first radially extending surface including a nose such that the circumferential width of said sprag between said nose and said second radially extending surface defines a circumferential arc-length, said nose contacting said second radially extending surface of an adjacent sprag along a pre-determined sprag contact diameter;

said arc-length being pre-selected as a function of one of said bearing diameters and of said pre-determined increment multiple such that a whole number of sprags are used to achieve positive continuous engagement.

7. A one-way sprag clutch as in claim 6, wherein said outer race bearing diameter equals said outer race sprag diameter.

8. A one-way sprag clutch as in claim 7, wherein said arc-length is pre-selected using the relationship:

$$ChordLength = (D_r - 2I)\pi/Nn$$

where:

$D_r$ = Bearing Outer Diameter $I$ = Fixed bearing increments $N$ = Number of Sprags $n$ = an integer.

9. A one-way sprag clutch as in claim 6, wherein said inner race bearing diameter equals said inner race sprag diameter.

10. A one-way sprag clutch as in claim 9, wherein said arc-length is pre-selected using the relationship:

$$ChordLength = (D_{ir} + 2I)\pi/Nn$$

where:

$D_{ir}$ = Bearing Inner Diameter $I$ = Fixed bearing increments $N$ = Number of Sprags $n$ = an integer.

11. A family of one-way sprag clutches, comprising:

concentric inner and outer races rotating about each other, each of said races defining a bearing diameter and a sprag diameter wherein bearing and sprag diameters are equal for one of said inner race or outer race;

a bearing between the races having inner and outer diameters corresponding to said inner and outer race bearing diameters, said bearing diameters differing within the family by a pre-determined increment multiple;

a plurality of identical, asymmetrical sprags arranged between said races, each said sprag including inner and outer surfaces for respectively engaging said inner and outer race sprag diameters and further including first and second radially extending surfaces extending between said inner and outer surfaces;

said first radially extending surface including a nose such that the circumferential width of said sprag between said nose and said second radially extending surface defines a circumferential arc-length, said nose contacting said second radially extending surface of an adjacent sprag along a pre-determined sprag contact diameter; said arc-length being pre-selected as a function of one of said bearing diameters and of said pre-determined increment multiple such that for said multiple a whole number of sprags are used to achieve positive continuous engagement.

12. A family of one-way sprag clutches as in claim 11, wherein a constant difference exists within the family of clutches between sprag contact diameter and one of inner or outer race sprag diameter.

* * * * *